(No Model.)

E. A. HENDRICKSON.
DEVICE FOR FEEDING SALT TO CATTLE.

No. 561,315. Patented June 2, 1896.

WITNESSES:

INVENTOR
Edward A Hendrickson

ATTORNEY.

UNITED STATES PATENT OFFICE.

EDWARD A. HENDRICKSON, OF BROOKLYN, NEW YORK.

DEVICE FOR FEEDING SALT TO CATTLE.

SPECIFICATION forming part of Letters Patent No. 561,315, dated June 2, 1896.

Application filed November 18, 1893. Serial No. 491,327. (No model.)

*To all whom it may concern:*

Be it known that I, EDWARD A. HENDRICKSON, a citizen of the United States, residing at the city of Brooklyn, county of Kings, and State of New York, have invented a certain new and useful Improvement in Devices for Feeding Salt or Compressed Feed to Cattle, of which the following is a specification.

My invention relates to devices in which a cake of salt or feed is placed so that the same will not fall out and cattle may have access thereto by means of an opening in the device.

The salt and feed devices for cattle now in use are objectionable for the reason that animals in consuming the food are apt to lick the same unevenly, whereby portions of the same become loosened and drop off, causing much waste and loss.

The object of my invention is to provide a simple and effective device for holding a cake of salt or feed which will not only prevent the cake placed therein from breaking or falling out while being consumed, but also be capable of adjustment, so that the same will be evenly consumed by the animal.

To this end my improvement consists, as will be more particularly hereinafter described, and pointed out in the claims, in combining with a hollow shell or annular casing having its wall flared inward keepers secured to a base adapted to engage with said shell or casing, which contains a cake of feed or salt, in such a manner that the cake or the shell containing the cake may be adjusted and held, as desired, in different positions.

Figure 1:
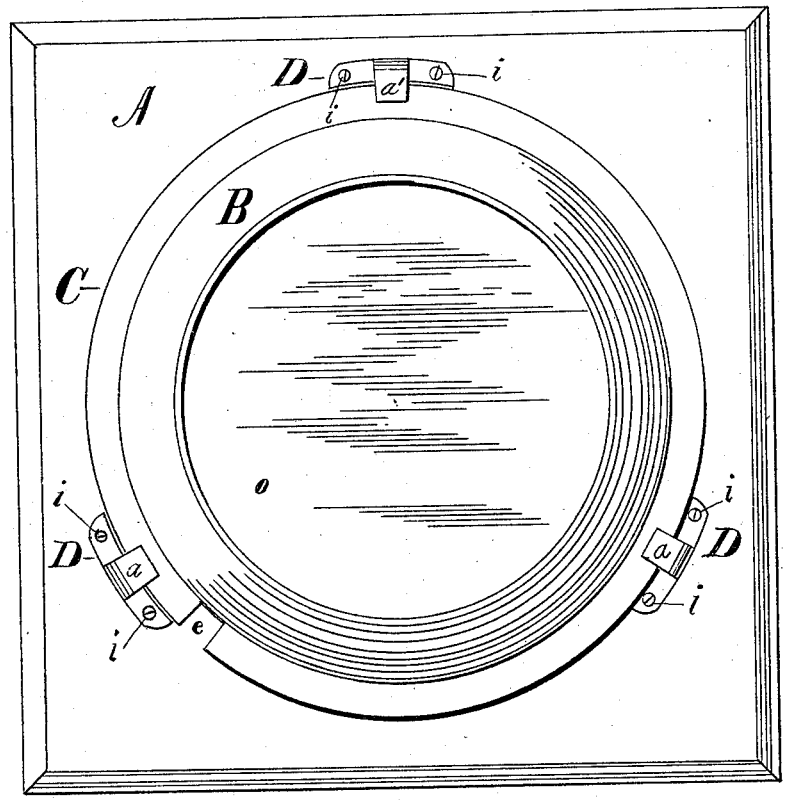
Figure 2:
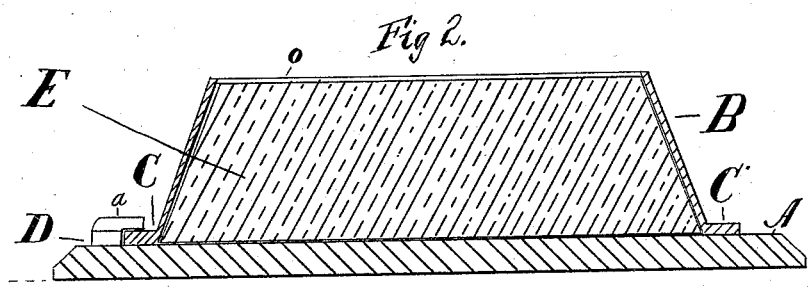

In the accompanying drawings, Figure 1 represents a top plan view of my improved holder. Fig. 2 represents a vertical section of the same containing a cake of salt or feed.

Similar letters of reference designate corresponding parts in both figures.

A designates the base of the holder, which may be made of wood or other material and can be secured to a wall or other support in any desired position by any suitable device.

B designates a hollow shell or annular casing, made of metal or other suitable material, preferably having its wall flared inward or in the form of the frustum of a cone.

C designates a rim or flange around the base of the shell B, having a cut $e$ therein, while the apex of the shell is provided with an opening $o$, extending through the same, preferably in the form of a truncated cone.

D designates several keepers, each having a lip $a$, one of which, as $a'$, is made of suitable form to allow the flange or rim C to pass over and beneath the same by means of the cut $e$ therein, the lip $a'$ being for this purpose made narrower than the other lips and narrower than this cut or notch $e$, so that this lip $a'$ may readily enter the notch when engaging or closing together the base and the shell or when disengaging them. The unnotched part of the flange is passed under the lips $a$ of the broader keepers, so that they may overlap it, the notch being brought to coincide in position with the lip $a'$, which then passes through the notch, and thus permits the flange to lie flat on the outer surface of the base A. The shell is then turned around to get the notch away from the lip $a'$. The shell is thus not only prevented from accidental dislodgment, but it is also free to be turned around in either direction to the right or left to the extent of a full revolution without risk of becoming disengaged from the base.

It will now be seen that by fastening the base A vertically at a proper height, by screws, nails, or other well-known means, upon an ordinary feed-box or stall or on any upright the shell B and its contained cake of salt or other feed will project outward from the outer face of such base and that the smaller end of the cake will thus be readily accessible to the tongue of the animal. These keepers are secured to the base A by screws $i$ or other suitable means.

E designates a cake or block of salt or feed of corresponding size and shape to the interior of the hollow shell or casing B.

I prefer to galvanize the shell and keepers, so as to prevent rust or other deterioration from exposure to weather or moisture.

In operation a cake of salt or feed is inserted into the hollow shell B, which is then inverted and the flange or rim C placed beneath the several lips on the keepers, so that the cut $e$ comes over the lip $a'$, and passes around and below the same, when the shell may be turned and the whole be secured by the keepers and flange upon the base. The opening $o$ in the apex of the shell is made of sufficient diameter to permit of an animal feeding to reach the bottom of the shell when the cake is nearly used up.

By my improved device, if the animals have a tendency to lap one or more particular portions of the cake, the cake may be shifted or the shell containing the cake may be turned upon the base, so as to present any uneven surface thereof for consumption.

It will be seen that as the cake of salt or feed is made cone shape, like the shell of the holder, it will engage with the inside of the shell and be prevented from falling out.

What I claim as new, and desire to secure by Letters Patent, is—

1. In a device for supporting a cake of compressed salt or feed with the face of the feed in vertical position, the combination with a solid base or back piece, of an annular revoluble shell or holder adapted to hold such cake and having its wall flaring inward, and means for removably connecting said shell directly to the outer face of such base, to permit the insertion and inclosing of the cake, and also permitting the revolution of the holder when connected with the base.

2. In a device for supporting a cake of salt or feed with the face of the same in substantially a vertical position, an unattached or separate holder for the cake, having its wall flared inward, a base or back for said holder serving as a closure for its rear or larger opening, and fastening devices as described serving to secure said removable holder to the base and also permitting the holder to have a rotary movement relatively to the base.

3. In a holder for a cake of salt or other feed, the combination with a wooden or equivalent base or back piece adapted to be secured as described to a vertical support, of the annular shell or casing having its wall flared inward, an annular flange on the large end of such shell or casing provided with an inward cut or notch, fixed hook-shaped keepers on the back piece, one of which is smaller than the others and is adapted to pass through said cut to engage with the base or back piece by a rotary movement of the shell or casing, so that a cake of salt or similar compressed feed conforming substantially to the interior of the shell or casing, may be held and adapted to have a rotary movement therein or therewith, substantially as specified.

4. In combination with a base or backing piece, the flaring feed-cake holder having a continuous circular flange at its larger end and a single notch made therein, and a set of keepers secured to the base or backing piece which serves to close the larger end of the holder, one of the keepers being adapted to pass through the notch, the combination being such that the holder is free to be revolved to any desired extent either to the right or left without tightening either the holder or the inclosed cake.

5. In combination, the vertical back piece or base, the flaring holder having a notched flange as described, and a set of keepers on the face of the base, having each a projecting lip to lap the flange, the lip of one only of the keepers being of such breadth as to permit the notch to admit it and pass behind it.

EDWARD A. HENDRICKSON.

Witnesses:
E. L. MOODIE,
VINCENT A. RYAN.